United States Patent [19]

Järvelä et al.

[11] Patent Number: 5,710,796
[45] Date of Patent: Jan. 20, 1998

[54] METHOD AND RECEIVER FOR DETERMINING A PHASE ERROR IN A RADIO-FREQUENCY SIGNAL

[75] Inventors: Mikko Järvelä ; Jukka Suonvieri, both of Oulu, Finland

[73] Assignee: Nokia Telecommunications Oy, Espoo, Finland

[21] Appl. No.: 557,178

[22] PCT Filed: Apr. 12, 1995

[86] PCT No.: PCT/FI95/00212

§ 371 Date: Mar. 14, 1996

§ 102(e) Date: Mar. 14, 1996

[87] PCT Pub. No.: WO95/28771

PCT Pub. Date: Oct. 26, 1995

[30] Foreign Application Priority Data

Apr. 13, 1994 [FI] Finland ............... 941713

[51] Int. Cl.[6] ............... H03K 9/00; H04L 27/14; H04L 27/22
[52] U.S. Cl. ............... 375/344; 375/316; 375/371
[58] Field of Search ............... 375/344, 316, 375/371, 329, 365; 455/136; 331/1 R; 370/100.1

[56] References Cited

U.S. PATENT DOCUMENTS

| | | |
|---|---|---|
| 4,847,869 | 7/1989 | Labedz et al. ............... 375/365 |
| 5,136,616 | 8/1992 | Dent ............... 375/362 |
| 5,151,936 | 9/1992 | Chennakeshu et al. . |
| 5,245,611 | 9/1993 | Ling et al. ............... 375/365 |
| 5,283,815 | 2/1994 | Chennakeshu et al. . |

FOREIGN PATENT DOCUMENTS

90/09070  8/1990  WIPO .
93/12601  6/1993  WIPO .

Primary Examiner—Stephen Chin
Assistant Examiner—Betsy Lee Deppe
Attorney, Agent, or Firm—Cushman Darby & Cushman Intellectual Property Group of Pillsbury Madison & Sutro LLP

[57] ABSTRACT

A method for determining a phase error in a radio-frequency signal received by a receiver, wherein an impulse response of a received signal is calculated, measuring points are chosen from the signal, and samples are taken from the surrounding areas of the measuring points. The samples are filter with a complex adapted filter. A phase error in the samples is measured from the filtering result, and the total phase error in the received signal is calculated on the basis of the measured phase error. In order to be also able to measure large phase errors, the measuring points are chosen on the basis of phase errors measured from signals received earlier, in such a manner that the phase error at the measuring points remains within predetermined limits. The receiver includes a compensator for the phase and frequency errors in the received signal.

13 Claims, 2 Drawing Sheets

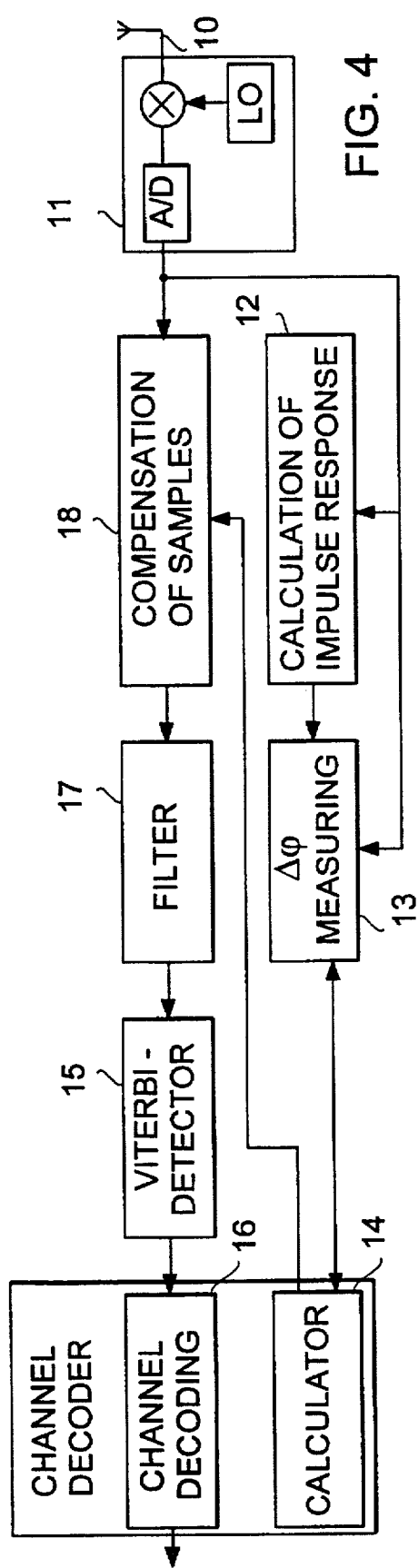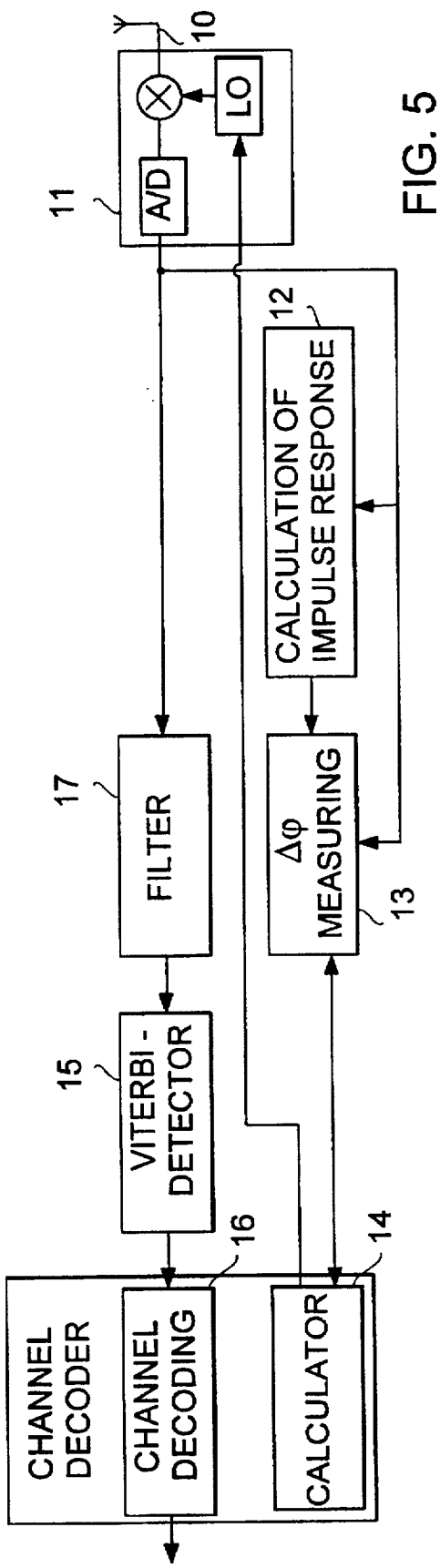

METHOD AND RECEIVER FOR DETERMINING A PHASE ERROR IN A RADIO-FREQUENCY SIGNAL

This application claims benefit of international application PCT/FI95/00212, filed Apr. 12, 1995.

BACKGROUND OF THE INVENTION

The invention relates to a method for determining a phase error in a received radio-frequency signal, wherein an impulse response of a received signal is calculated, measuring points are chosen from the signal, and samples are taken from areas surrounding the measuring points, the samples are filtered with a complex adapted filter, the phase error in the samples is measured from the filtering result, and the total phase error in the received signal is calculated on the basis of the measured phase error. The invention also relates to a receiver for receiving a radio-frequency signal, the receiver comprising: means for calculating an impulse response for a received signal, sampling means for taking samples of the signal at chosen measuring points, complex adapted filtering means for filtering the samples, measuring means for measuring a phase error in the filtered samples, calculating means responsive to the measuring means for calculating the total phase error in the received signal on the basis of the measured phase error, and compensation means for compensating for the phase error in the received signal.

The present invention relates especially to digital mobile communication systems, such as the GSM (Groupe Special Mobile) and DCS systems (Digital Cellular System). A subscriber station of e.g., the GSM system uses a signal received from a base station as its frequency reference. With a stationary subscriber station the frequency synchronization works well, but when the subscriber station is moving, the Doppler effect causes a frequency error directly proportional to the speed of the mobile phone. The frequency error detected by the base station is double compared with that seen by the subscriber unit, wherefore the frequency error is more problematic as regards the base station. Additionally, in the DCS system, the problem is double that of the GSM system because of the double carrier frequency.

In addition to the Doppler effect, a frequency error in the transmitter of a subscriber station may cause an additional frequency error at the receiving side of the base station. GSM specifications allow a 90 Hz frequency error in the transmitter of a subscriber station, the corresponding value being 180 Hz in the DCS system. In defective subscriber units, the allowable frequency error value may, however, be significantly exceeded.

A prior art solution to measuring and compensating for a frequency error in a subscriber station is a method wherein the frequency error is calculated on the basis of phase errors at the beginning and at the end of a burst. Once the phase error is known, it may be used to calculate the frequency error in the received signal. In measuring, this prior art solution utilizes the characteristics of a complex adapted filter. After this filter the phase error in the signal equals zero, and where a fixed frequency error is concerned, the phase error will grow linearly towards the edges of the received burst.

The drawback of the above described prior art method is a narrow measuring band. Large frequency errors cause a large phase error at the edges of a burst, and large phase errors (>60°) cause measuring errors due to an excessive convolving of the signal state diagram. Only small frequency errors (below 400–500 Hz) may thus be measured by this known method. Practice has shown that with too large a frequency error, the measuring algorithm has detected the wrong frequency, which has resulted in failure to correct the frequency error.

SUMMARY OF THE INVENTION

The object of the present invention is to solve the above problem and provide a method for measuring significantly larger phase errors than by known methods. This object is achieved with the method of the invention, which is characterized in that the measuring points are chosen on the basis of phase errors measured from signals received earlier so that the phase errors at the measuring points will remain within predetermined limits.

The invention is based on the idea that by moving the measuring points in a burst, significantly larger phase and frequency errors than before may be measured with the measuring equipment. Correspondingly, the measuring accuracy of small frequency and phase errors may be improved by moving the measuring points. The moving of the measuring points is taken into account in the calculation of the total phase error in the burst. The most significant advantages of the method of the invention are thus that it provides means for determining larger phase and frequency errors than before, and that the accuracy of measuring small phase and frequency errors is improved.

The object of the invention is additionally to provide a receiver by means of which the frequency error in a received signal may be corrected by utilizing the method of the invention. This goal is achieved with a receiver of the invention, which is characterized in that the receiver comprises adjusting means which, on the basis of phase errors measured earlier, adjust the measuring points of the sampling means in order to keep the measured phase errors within predetermined limits.

BRIEF DESCRIPTION OF THE DRAWINGS

In the following, the invention and some of its preferred embodiments will be described in greater detail with reference to the accompanying drawings, in which:

FIG. 4 shows the first preferred embodiment of the receiver of the invention, and FIG. 5 shows the second preferred embodiment of the receiver of the invention.

DETAILED DESCRIPTION

The following is an illustrative description of the invention relative to the GSM system. The GSM system is described in greater detail e.g. in "The GSM System for Mobile Communications", M. Moyly and M-B. Pautet, Palaiseau, France, 1992, ISBN: 2-9507190-0-7 and is therefore not described in greater detail in this connection.

Figure 1:
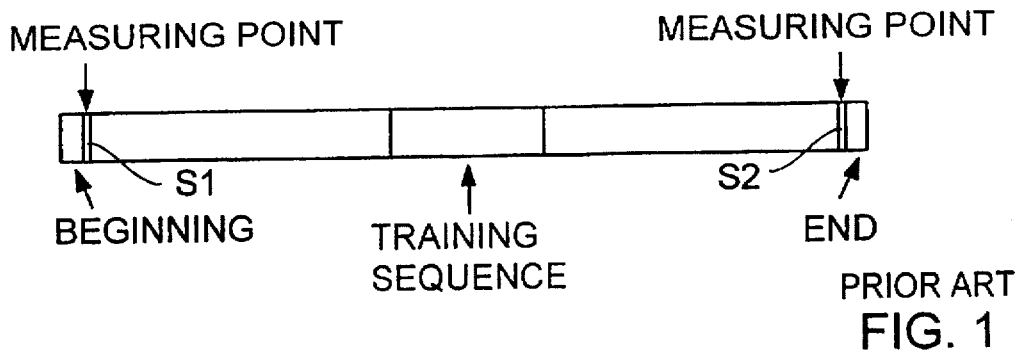
FIG. 1 illustrates a phase error measuring method known per se.

According to the GSM specifications, a normal burst contains two information sections (58 bits) separated by a training sequence (26 bits) in the middle of the burst. In addition the burst contains a short (3 bits) beginning and end sequence, at the ends of the burst. As FIG. 1 shows, the frequency error in a received signal has traditionally been determined by measuring the phase errors at the ends, and thus the measuring points have been chosen from the ends of the burst. Samples S1 and S2 have been taken from a 16-bit sequence. Characteristics of a complex adapted filter have been utilized in the measuring, whereby, after filtration, the phase error in the received signal is zero in the middle of the burst, at the training sequence. In a case of a fixed frequency error, the phase error in the burst will grow linearly towards the edges of the burst. In this case it will be sufficient to estimate the phase error at the ends of the burst.

Figure 2:
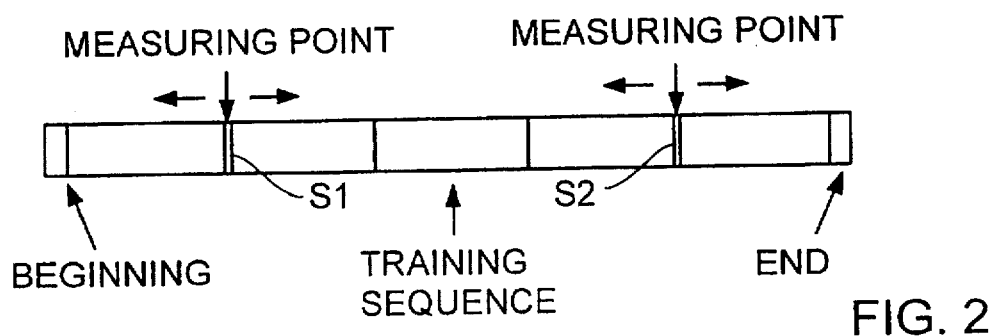
FIG. 2 illustrates the phase error measuring method of the invention.

FIG. 2 illustrates the phase error measuring method of the invention. Initially the measuring points are adapted to the middle parts of the measuring ranges of the burst. In this connection the measuring ranges refer to two ranges limited by a known training sequence in the middle of the burst and the end (3 bits) and beginning (3 bits) of the burst. 16-bit samples S1 and S2 are taken from the measuring points.

After the phase errors at the chosen measuring points have been measured, an average value is calculated for the phase errors measured at predetermined time intervals. If the resulting average value is not within the predetermined limit values, the measuring points are moved before the determination of the phase error in the next burst so that the measured phase error will remain within the predetermined limits. In other words, when the measured phase error is small, the measuring points are moved towards the edges of the burst, and when the phase error is big, the measuring points are moved towards the training sequence in the middle of the burst.

Experiments show that a measured phase error of 60° or more will cause the signal state diagram to convolve excessively, and in this case the phase error cannot be determined if the measuring points are at the edges of the burst. Moving the measuring points towards the middle will lead to impaired measuring accuracy. This is why dynamic adjustment of the measuring points of the invention is needed.

Figure 3:
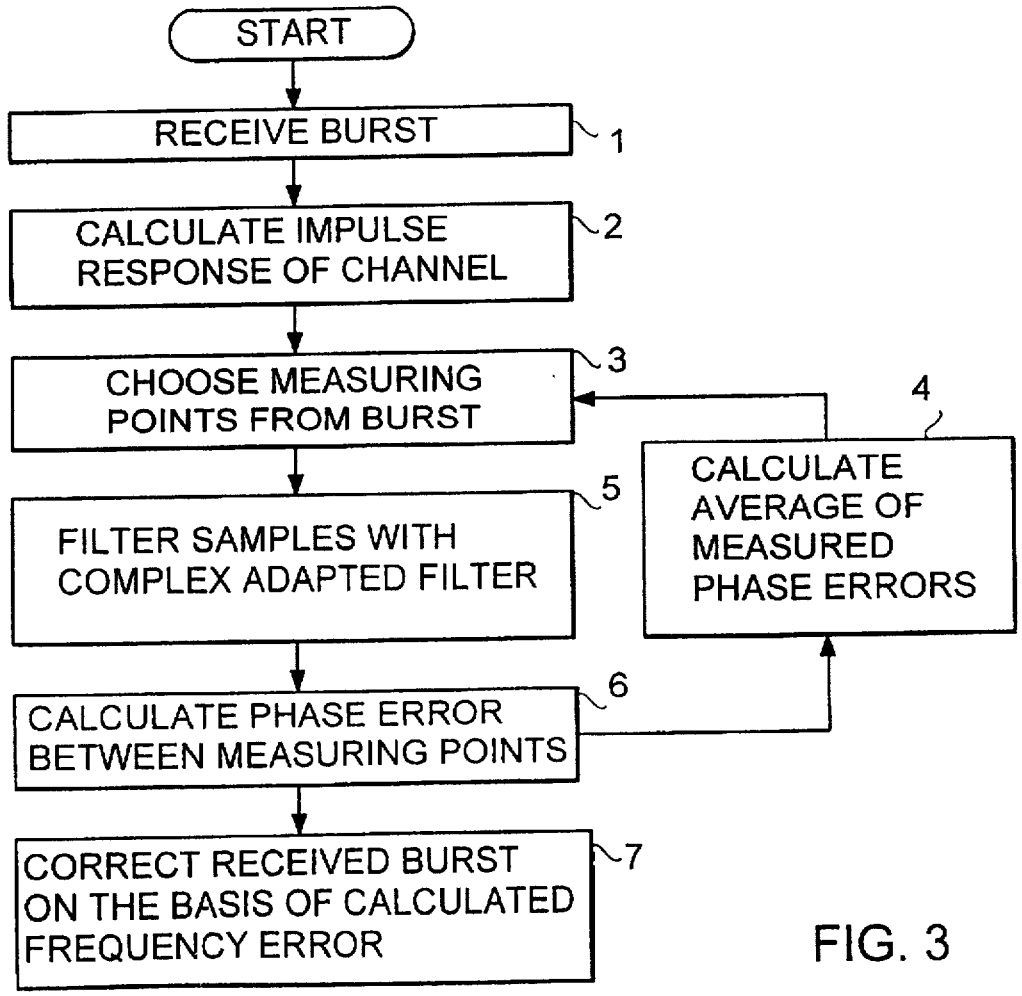
FIG. 3 shows a flow chart by means of which a phase error in a received burst may be defined and corrected.

FIG. 3 shows a flow chart by which the phase error in a received burst may be determined and corrected. The phase error calculating method of the invention is based on the characteristics of a complex adapted filter.

After the burst is received in block 1, the impulse response of the channel is calculated in block 2. In the GSM system, the impulse response of a channel is calculated using the correlation technique from the known training sequence of the received burst, the sequence being situated in the middle of the burst (cf. FIGS. 1 and 2). The estimated taps of the channel impulse response are input into a complex adapted filter, which is thus completely adapted to the received signal at least in the middle of the burst. The taps are complex and there are 5 of them per each burst. The taps are estimated at an interval of one bit block (3.69 µs).

Measuring points of the received burst are chosen in block 3. The choice of measuring points is based on phase errors measured from bursts received earlier, i.e. in practice on their average value, as explained in connection with FIG. 2. Information on earlier measuring results is received from block 4. After the measuring points have been chosen, samples from a 16-bit sequence around the measuring points of the received burst are input together with the taps into a complex adapted filter.

In block 5, the samples are filtered with a complex adapted filter. E.g. a digital FIR-filter may be used. Once the filter is completely adapted to the received signal, a real signal is received as a result of the filtration. If the received burst has a phase error, it will appear in the filtering result as an increase in the imaginary part of the filtering result. This characteristic is utilized in estimating the phase error in the received burst. The vectors obtained as filtration results are summed up as such at the beginning of the burst and reversely at the end of the burst. The resulting phase vector V shows the average phase inversion from the middle of the burst to the measuring points.

The total phase shift β of the signal at the ends of the burst is given by phase vector V:

$$\beta = 2 * \arctan(\text{Im}(V)/\text{Re}(V))$$

To improve the reliability of the result, the phase error β in the burst may additionally be averaged for the duration of a SACCH frame (Slow Associated Control Channel).

The resulting phase shift or phase error β received in block 6 is fed into blocks 4 and 7. In block 4, it is used to calculate the average of the phase errors measured at predetermined time intervals. This information is utilized in the choice of measuring points for bursts to be received next.

In block 7, the received burst is corrected on the basis of the calculated phase error β. In the frequency error compensation phase, a sample taken from each burst is corrected by inverting its phase by the opposite value of an error angle.

To accomplish this, the calculated phase error is at first interpolated on the length of the whole burst, i.e., if the phase error β has been measured from e.g., a length of 128 bits, the portion of a single bit of the total phase error is β/128.

Inversion of a signal phase, i.e. correction of a phase error, is accomplished by multiplying the signal points, i.e. each sample ($I_n$, $Q_n$), with a rotation matrix. The corrected signal points are thus given by the formula:

$$\begin{bmatrix} \hat{I}_n \\ \hat{Q}_n \end{bmatrix} = \begin{bmatrix} \cos(-\alpha_n) & -\sin(-\alpha_n) \\ \sin(-\alpha_n) & \cos(-\alpha_n) \end{bmatrix} * \begin{bmatrix} I_n \\ Q_n \end{bmatrix}$$

where $\alpha_n$ is the estimated and interpolated phase error of bit n.

FIG. 4 shows the first preferred embodiment of the receiver of the invention. FIG. 4 shows a receiver unit of a GSM base station, this unit measuring the phase error in a received burst by following the block diagram of FIG. 3. A radio-frequency burst, received with a reception means, e.g., an antenna 10, is input into a receiver 11. The receiver 11 will disassemble the input signal by utilizing an oscillator LO, whereafter the received signal is fed into an AD-converter. The samples obtained from the output of the AD-converter are fed into an impulse response calculating unit 12, into a measuring block 13, and into a compensation unit 18.

The impulse response calculating unit will calculate the impulse response of the channel in a manner known per se, and will feed the estimated channel impulse response taps into the measuring block 13.

The measuring block 13 chooses measuring points from the received burst on the basis of the average of the measured phase error calculated by a calculator 14 so that the measured phase error will remain between 0° and 60°, preferably between 20° and 40°. Next, samples are taken from the chosen measuring points in the measuring block so that samples are taken from a 16-bit sequence from both measuring points. Next the samples are filtered with a complex adapted filter. If the received burst has a phase error, it will appear in the filtering result as an increase of the imaginary part of the filtering result.

Information on the measured phase error is fed into the calculator 14 where it is used in calculating the total phase error as shown in connection with FIG. 3, and in calculating the average of the measured phase errors. The average measured phase error calculated by the calculator 14 is fed into the measuring block 13. The calculator 14 will feed information needed for compensation of the signal into the compensation unit 18.

The compensation unit 18 will correct the samples taken from the received signal to remove the effect of the phase error (i.e. frequency error) from them; this is achieved by multiplying each sample with the rotation matrix described herein in the context of the flow chart of FIG. 3. It is preferable that the compensation be based on the average phase error, as thus it is possible to minimize the effects of possible momentary disturbances. The samples corrected by the compensation unit are fed into a filter 17 adapted to the received signal. Signals obtained from the output of the filter 17 are fed into a Viterbi-detector 15, where the interaction caused by multipath transmission is removed. The output signal of the Viterbi-detector 15 is fed into a channel decoder 16, where the received signal is decoded in a manner known per se.

FIG. 5 shows the second preferred embodiment of the receiver of the invention. FIG. 5 shows a receiver unit of a GSM base station, this unit corresponding to that in FIG. 4, with the exception that the compensation unit 18 is included in the calculator 14. In this way, the calculator 14 will adjust the local oscillator LO of the receiver 11 on the basis of the average total phase error in such a manner that the phase error (i.e. frequency error) will be compensated for.

It should be understood that the above description and accompanying figures are only intended to illustrate the present invention. Thus, the method of the invention may also be utilized in other connections than in the illustrative case of the GSM system. The preferred embodiments of the method and receiver of the invention may thus vary within the scope of the attached claims.

We claim:

1. A method for determining a phase error in a received radio-frequency signal, comprising:

calculating an impulse response of a received signal;

choosing measuring points said signal, and taking samples from areas surrounding said measuring points;

filtering said samples with a complex adapted filter;

measuring the phase error in said samples from the filtering result; and calculating the total phase error in the received signal on the basis of the measured phase error;

said choosing of said measuring points being accomplished on the basis of phase errors measured from signals received earlier so that the phase errors at the measuring points will remain within predetermined limits.

2. The method as claimed in claim 1, wherein:

said choosing of said measuring points is accomplished by calculating an average of the phase errors measured earlier, whereby the measuring points are chosen in such a manner that the measured phase error will remain within predetermined limits.

3. The method as claimed in claim 1, wherein:

said predetermined limits are between 0° and 60°.

4. The method as claimed in claim 1, wherein:

said received signal is a radio frequency signal which is a burst received by a receiver of a digital mobile communication system.

5. The method as claimed in claim 4, wherein:

said two measuring points are chosen from said burst, one before a training sequence of said burst and the other thereafter, and samples from both measuring points are taken from a 16-bit sequence.

6. A receiver for receiving a radio-frequency signal, said receiver comprising:

receiving means for receiving a radio-frequency signal;

means for calculating an impulse response for said received signal;

sampling means for taking samples of said received signal at a plurality of chosen measuring points;

complex adapted filtering means for filtering said samples to provide filtered samples;

measuring means for measuring a phase error in said filtered samples;

calculating means responsive to said measuring means for calculating the total of said phase errors in said received signal on the basis of said measured phase error; and compensation means for compensating for the phase error in said received signal;

said receiving means including adjusting means which, on the basis of said phase error measured by said measuring means, adjust the measuring points of said sampling means in order to keep the measured phase error within predetermined limits.

7. The receiver as claimed in claim 6, wherein:

said adjusting means will adjust the measuring points of the sampling means on the basis of an average of said phase error measured by said measuring means.

8. The receiver as claimed in claim 6, wherein:

said receiver is a receiver of a digital mobile communication system, and said signal is a radio burst.

9. The receiver as claimed in claim 6, wherein:

said compensation means is arranged to compensate for a received signal on the basis of the calculated phase error.

10. The receiver as claimed in claim 6, wherein:

said compensation means is arranged to compensate for a received signal on the basis of an average of calculated total phase errors.

11. The method as claimed in claim 1, wherein:

said predetermined limits are between 20° and 40°.

12. The method as claimed in claim 4, wherein:

a system is the GSM system.

13. The receiver of claim 8, wherein:

said receiver is a GSM system receiver.

* * * * *